D. T. WILLIAMS.
VALVE.
APPLICATION FILED JULY 28, 1908.

919,508.

Patented Apr. 27, 1909.

Witnesses:

David T. Williams, Inventor
By his Attorneys

UNITED STATES PATENT OFFICE.

DAVID T. WILLIAMS, OF PATERSON, NEW JERSEY, ASSIGNOR TO VACUUM ENGINEERING COMPANY, OF NEW YORK, N. Y., A CORPORATION OF NEW YORK.

VALVE.

No. 919,508.          Specification of Letters Patent.          Patented April 27, 1909.

Application filed July 28, 1908. Serial No. 445,760.

*To all whom it may concern:*

Be it known that I, DAVID T. WILLIAMS, a British subject, residing in the city of Paterson, county of Passaic, State of New Jersey, have invented certain new and useful Improvements in Valves, of which the following is a full, clear, and complete disclosure.

My invention relates particularly to that class of valves which are particularly adapted for use in connection with pneumatic cleaning implements. In such cleaning implements, it is necessary to provide a valve in the handle of the implement adjacent its end where it is connected with the flexible pipe or conduit in which the suction is produced. Such a valve should preferably be so constructed as to produce no substantial enlargement in the diameter of the handle of the implement, and at the same time it must have openings of sufficient area so as not to impede the action of the suction in the conduit and handle of the implement. The valve must also be easily controllable, and must also be capable of being fixed at any definite degree of opening so that the amount of suction in the cleaning head may be regulated.

For a detailed description of one form of my invention which I at present deem preferable, reference may be had to the following specification and to the accompanying drawing forming a part thereof, in which—

Figure 1:
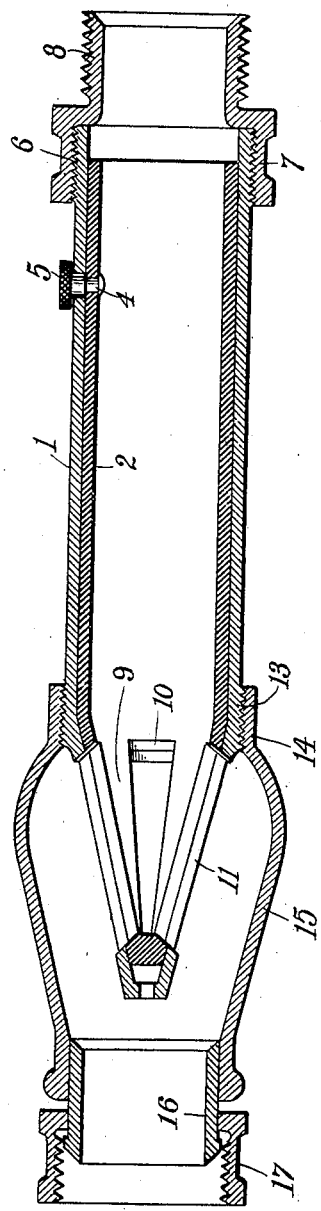
Figure 2:
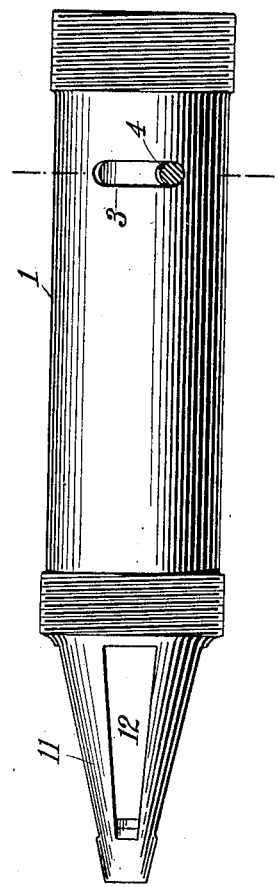
Figure 3:
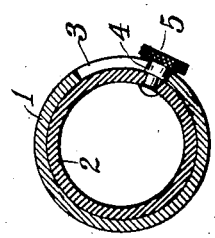

Figure 1 is a longitudinal sectional view of my improved valve; Fig. 2 is an exterior view of the same showing the valve casing and the connecting sleeve at the ends removed. Fig. 3 is a transverse sectional view taken substantially on the line A—A, Fig. 2.

Referring to the drawing, the numerals 1 and 2 indicate respectively outer and inner tubes, accurately fitted to each other, but capable of rotation one within the other.

The numeral 3 indicates a slot in the outer tube 1, which coöperates with a stud 4, carried by the inner tube 2, and is provided at its outer end with a thumb-head. This thumb-head is for the purpose of fixing the relative angular positions of the inner and outer tubes. The outer tube 1 is also screw-threaded, as indicated at 6, and engages a screw-threaded cap 7, which is connected with an exteriorly screw-threaded sleeve 8, adapted to be connected with the flexible conduit by any suitable form of coupling. The opposite end of the inner tube 2 is made conical in shape, as indicated at 9, and is provided with a plurality of tapering slots or openings 10. The corresponding end of the outer tube 1 is also made conical in shape, and its inner surface is accurately fitted to the outer surface of the conical portion 9 of the inner tube 2, as indicated at 11. The conical portion 11 of the outer tube 1 is also provided with tapering slots or openings 12, which correspond in shape to the openings 10 in the conical portion 9 of the inner tube. The outer tube 1 is provided with a screw-threaded portion 13 which engages an anteriorly screw-threaded sleeve 14 forming a part of the valve casing 15, which is slightly bulged or extended to give sufficient space between the conical portion 11 and said casing. The outer end of the casing 15 is provided with a sleeve 16, which carries the usual screw-threaded coupling 17 adapted to engage the end of the handle of the cleaning implement.

By virtue of the construction above set forth, it will be seen that the openings in the valve through which the air and the cleaning liquid must pass are of a much greater area than where ordinary valves are used, and this area may be easily so designed as to even exceed the area of the conduits through which the suction is produced. This is accomplished without increasing the size of the handle of the implement to any substantial extent, and without producing any complicated parts that would be subject to deterioration or wear.

Having thus described this form of my invention, I do not wish to be understood as being limited to the exact details of form and arrangement of parts set forth, for various changes may be made in same by those skilled in the art without departing from the spirit and scope of my invention.

What I claim and desire to protect by Letters Patent is:

A valve for a pneumatic cleaning implement, comprising inner and outer cylindrical tubes, said tubes being elongated to form a handle or gripping portion and having conical closures at corresponding ends of each of said tubes, said closures having longitudinal passages or openings therein, and being adapted to rotate relatively, a stud carried by the inner tube and projecting through a segmental slot in the outer tube, said stud and slot being located in the cylindrical portions of said tubes, an enlarged casing carried by the outer tube and extending about the conical ends of said tubes and means at the ends of said casing for connecting it to the handle of the pneumatic cleaning implement.

Signed this 22nd day of July, 1908.

DAVID T. WILLIAMS.

Witnesses:
JAMES J. COSGROVE,
JOHN W. PETERS.